United States Patent
Iida

[11] Patent Number: 5,889,939
[45] Date of Patent: Mar. 30, 1999

[54] DISK DRIVE WITH A PFA FUNCTION AND MONITOR VALUE SAVING CONTROL METHOD IN THE SAME

[75] Inventor: Ikuko Iida, Tokyo, Japan

[73] Assignee: Kabushiki Kaisha Toshiba, Kawasaki, Japan

[21] Appl. No.: 794,831

[22] Filed: Feb. 4, 1997

[30] Foreign Application Priority Data

Jun. 28, 1996 [JP] Japan .................................. 8-169751

[51] Int. Cl.⁶ .................................................. G06F 11/00
[52] U.S. Cl. ................................ 395/187.01; 395/187.01
[58] Field of Search ........................ 395/189.01, 183.16, 395/183.21, 182.03, 182.06, 182.04, 185.08, 183.18; 211/155, 159, 118, 135; 159/118; 371/5.1

[56] References Cited

U.S. PATENT DOCUMENTS

| | | | |
|---|---|---|---|
| 4,916,605 | 4/1990 | Beardsley et al. | 395/180 |
| 5,410,439 | 4/1995 | Egbert et al. | 360/75 |
| 5,500,940 | 3/1996 | Skeie | 395/183.01 |
| 5,539,592 | 7/1996 | Banks et al. | 360/75 |
| 5,611,069 | 3/1997 | Matoba | 395/182.04 |
| 5,625,506 | 4/1997 | Dovek et al. | 360/51 |
| 5,673,383 | 9/1997 | Sukegawa | 395/182.06 |
| 5,701,480 | 12/1997 | Raz | 395/182.17 |
| 5,717,850 | 2/1988 | Apperley et al. | 395/182.04 |
| 5,724,581 | 3/1998 | Kozakura | 395/182.17 |
| 5,727,144 | 3/1988 | Brady et al. | 395/182.04 |

*Primary Examiner*—Joseph E. Palys
*Attorney, Agent, or Firm*—Finnegan, Henderson, Farabow, Garrett & Dunner, L.L.P.

[57] ABSTRACT

A CPU increments the variation in the corresponding monitor value in a monitor value storage area secured in a RAM, each time an event to be monitored has occurred. When the monitor value must be stored, the CPU adds the incremented one of the variations in the individual monitor values stored in the monitor value storage area to the corresponding value in a monitor value saving area secured in the system area of the disk, executes monitor value saving control by which the monitor value is replaced with the resulting monitor value, and then clears the monitor value storage area.

10 Claims, 3 Drawing Sheets

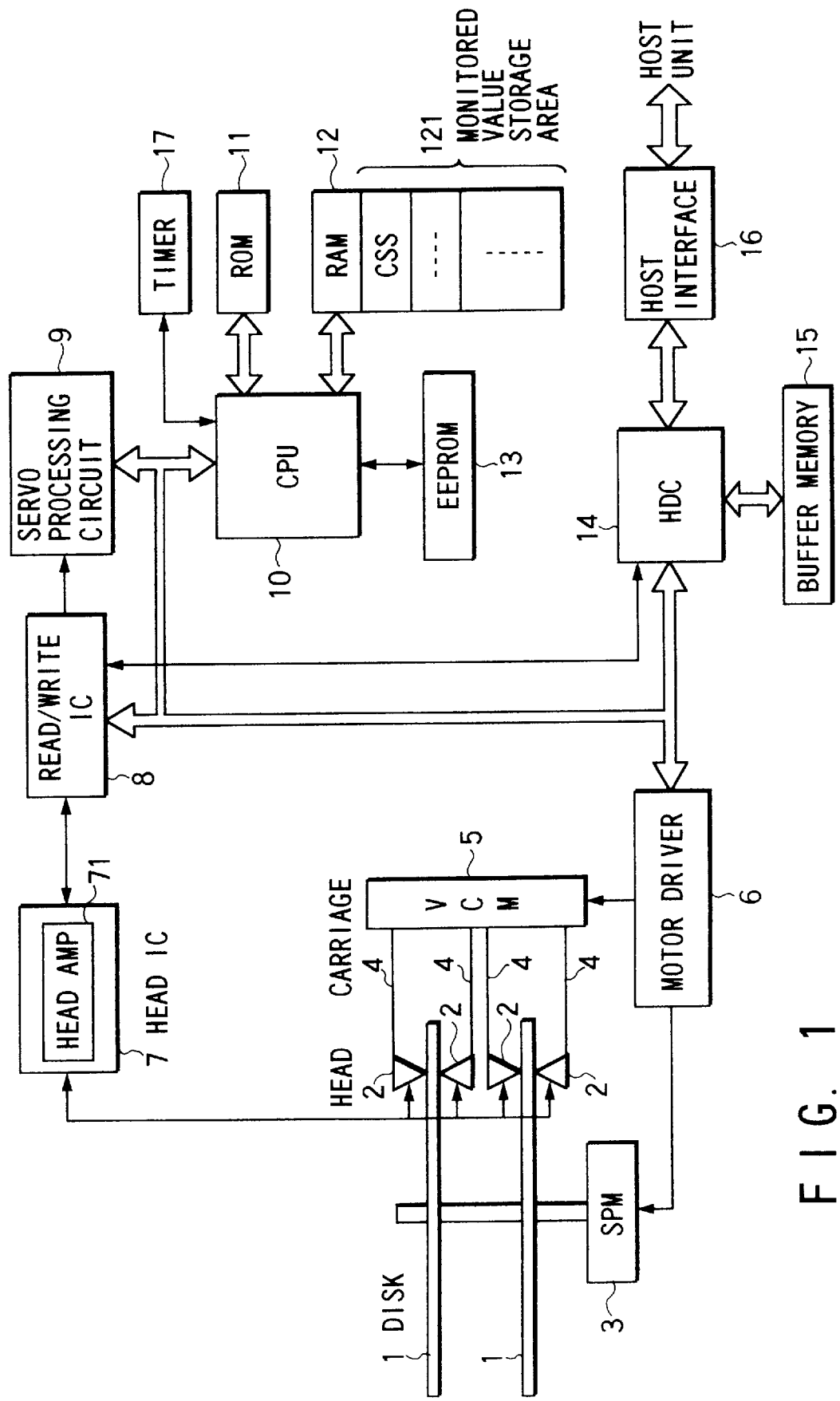
F I G. 1

DISK DRIVE WITH A PFA FUNCTION AND MONITOR VALUE SAVING CONTROL METHOD IN THE SAME

BACKGROUND OF THE INVENTION

This invention relates to a disk drive with a PFA function and a monitor value saving control method in the disk drive.

In recent years, a magnetic disk drive with the function of predicting a failure in the drive beforehand (a PFA function: predictive failure analysis (PFA) mechanism) has been developed. The PFA function monitors, as the parameters for PFA, (the number of occurrences and the like of) various events that can contribute (have a close cause and effect relation) to failures in the magnetic disk drive and predicts a failure in the drive from the monitor values (parameter values). Such a PFA mechanism has been disclosed in, for example, U.S. Pat. No. 5,410,439 (issued to Egbert et al. on Feb. 22, 1994). The parameters are data items used to determine whether or not the drive is in a critical condition. Typical ones of the parameters include start-up time, the number of starts/stops of motor (the number of CSSs), the number of seeks, the number of substitute sectors (the number of times that spare sectors on the spare track preliminarily provided are substituted for defective sectors), power-on time, start retry (the number of times that the motor has been started by retry), the number of power cycles (the number of power ON operations), the number of occurrences of read errors (read error rate), and the number of occurrences of seek errors (seek error rate).

The aforementioned parameters change at various times, such as at the time of start-up of the drive or a read/write operation. Since the monitor value of a parameter of this type takes a unique value to the disk drive, it is necessary to save it in a nonvolatile storage medium (e.g., a disk or a nonvolatile memory). Saving the data in a nonvolatile storage medium, however, needs a lot of time. An event accompanying an operation required to be processed at high speeds is sometimes used as a parameter to be monitored, depending on the way that the parameter is decided. In this case, since sensing the relevant event and updating the monitor value can decrease the performance of the drive, the monitor value has to be saved in as short a time as possible.

To solve this problem, the monitor values of various parameters have been stored in a cache memory provided in the disk drive. Specifically, the monitor values of various parameters are temporarily stored in a volatile memory, such as a RAM, faster in access speed than a nonvolatile storage medium. In a situation where the performance is not affected, a monitor value saving process has been performed which saves the monitor values in the volatile memory into a nonvolatile storage memory (a nonvolatile memory or a disk).

The cache memory provided in the drive unit, however, has a limited memory capacity and is also used for various control actions, in addition to the storage of the aforementioned various parameters. For instance, the total capacity of the cache memory is 688 bytes, of which 535 bytes are used for control of the mechanical system of the drive unit and 33 bytes are used for communication with the host unit. In addition, 19 bytes are used for power saving, 35 bytes for read/write operation, 22 bytes for UART (Universal Asynchronous Receiver Transmitter), 5 bytes for security, and 12 bytes for work registers. The total number of bytes necessary for the above-described control operations is 661 bytes. As a result, the remaining 27 bytes are the number of bytes that can be used to save parameters for PFA. The parameters for PFA require 4 bytes for start-up time, 4 bytes for the number of CSSs, 4 bytes for the number of seeks, 2 bytes for the number of substitute sectors, 3 bytes for power-on time, 8 bytes for start retry (4 bytes for parameter 1, 2 bytes for parameter 2, and 2 bytes for parameter 3), 4 bytes for the number of power cycles, 4 bytes for seek error rate, and 4 bytes for read error rate, which come to 37 bytes in total and cannot be saved in the cache memory. This limits the number of parameters stored in the cache memory, causing the problem of failing to provide a satisfactory PFA function. On the other hand, the idea of increasing the capacity of the cache memory leads to the problem of raising cost.

BRIEF SUMMARY OF THE INVENTION

The object of the present invention is to provide a disk drive capable of decreasing the capacity of a volatile memory area allocated to temporarily store the monitor values of various parameters used for PFA and a monitor value saving control method in the disk drive.

According to a first aspect of the present invention, a disk drive having a failure prediction function for monitoring predetermined various events relating to failures of the drive and for predicting a failure of the drive from the monitored values, comprises: nonvolatile storage means in which a monitor value saving area is secured for saving a monitor value of each event; volatile storage means in which a temporary monitor value storage area is secured for temporarily storing a variation of a monitor value of each event saved in the monitor value saving area; update means for updating the monitor value variation stored in the monitor value storage area corresponding to the event each time a predetermined event is detected; and monitor value saving control means for, when the monitor value is required to be saved in the monitor value saving area, adding at least the monitor value variation updated by the updating means among the monitor value variations stored in the temporary monitor value storage area to the corresponding monitor value saved in the nonvolatile storage means, and for substituting the addition result for the corresponding monitor value.

According to a second aspect of the present invention, a monitor value saving control method in a disk drive having a failure prediction function for monitoring predetermined various events related to a failure of the drive and for predicting a failure of the drive from the monitored values, the method comprising the computer steps of: saving a monitor value of each event in a monitor value saving area of a nonvolatile memory; temporarily storing, in a temporary monitor value storage area of a volatile memory, a variation of the monitor value of each event saved in the monitor value saving area; updating a monitor value variation in the temporary monitor value storage area corresponding to the event each time a predetermined event is detected; and adding, when the saving of the monitor value is to be required in the monitor value saving area, at least updated monitor value variation among the monitor value variations stored in the temporary monitor value storage area to the corresponding monitor value stored in the monitor value saving area and for substituting the addition result for the corresponding monitor value.

According to a third aspect of the present invention, there is provided a disk drive having a failure prediction function for monitoring predetermined various events relating to failures of the drive and for predicting a failure of the drive from the monitored values, comprising: monitor means for monitoring predetermined various events relating to failures of the drive; nonvolatile storage means in which a monitor-value saving area is secured for saving a monitor value of each event; volatile storage means in which a temporary monitor value storage area is secured for temporarily storing a variation of a monitor value of each event saved in the monitor value saving area; update means for updating the monitor value variation stored in the temporary monitor value storage area corresponding to the event each time a predetermined event is detected; monitor value saving control means for, when the monitor value is required to be saved in the monitor value saving area, adding at least the monitor value variation updated by the updating means among the monitor value variations stored in the monitor value storage area to the corresponding monitor value saved in the nonvolatile storage means, and for substituting the addition result for the corresponding monitor value; and predicting means for predicting a failure of the drive from the monitor values saved in the monitor value saving area including the substituted monitor value.

According to a fourth aspect of the present invention, there is provided a monitor value saving control method in a disk drive having a failure prediction function for monitoring predetermined various events relating to failures of the drive and for predicting a failure of the drive from the monitored values, comprising the steps of: monitoring predetermined various events relating to failures of the drive; saving a monitor value of each event in a monitor value saving area of a nonvolatile memory; temporarily storing, in a temporary monitor value storage area of a volatile memory, a variation of a monitor value of each event saved in the monitor value saving area; updating the monitor value variation stored in the monitor value storage area corresponding to the event each time a predetermined event is detected; adding at least the monitor value variation updated by the updating means among the monitor value variations stored in the monitor value storage area to the corresponding monitor value saved in the nonvolatile storage means, and for substituting the addition result for the corresponding monitor value, when the monitor value is required to be saved in the monitor value saving area; and predicting a failure of the drive from the monitor values saved in the monitor value saving area including the substituted monitor value.

Here, when monitor value saving control is performed by the monitor value saving control means, or when the variation in the monitor value stored in the monitor value storage area is added to the corresponding monitor value saved in the monitor value saving area and the monitor value is replaced with the resulting monitor value, the monitor value storage area should be cleared.

With the disk drive, each time a predetermined event has been sensed, the variation in the monitor value in the monitor value storage area in the volatile storage means corresponding to the event is updated (incremented). This enables the variation in the monitor value in the monitor value storage area to represent the number of times that the event has been monitored since the monitor value of the corresponding event was saved in the monitor value saving area in the nonvolatile storage means (since the start-up in a state where any monitor value had never been stored in the monitor value saving area), that is, the variation with respect to the monitor value of the event saved in the monitor value saving area at that time.

When the monitor values must be saved, for example, when the host unit has issued a command (PFA information report command) requesting the report of PFA information or when an event for which the auto saving function for automatically saving the monitor value (e.g., when the drive is set in the auto standby mode in which the rotation of the disk is stopped for power saving, provided that the host unit has not given any command for a specific period of time), at least the updated one of the variations in the monitor values stored in the monitor value storage area is added to the corresponding monitor value saved in the monitor value saving area and the monitor value is replaced with the resulting monitor value.

As described above, by storing into (the monitor value storage area in) the volatile storage means only the variation in the monitor value from the time when the previous saving was done into (the monitor value saving area in) the nonvolatile storage means, the capacity of the volatile storage means to be allocated to the monitor value storage means can be reduced as compared with the case of storing the monitor value itself.

Furthermore, by just adding the variation in the monitor value stored in (the monitor value storage area in) the volatile storage means to the corresponding monitor value saved in the monitor value saving area, the correct monitor value up to that point in time can be obtained.

As described so far in detail, with the present invention, since only the variation with respect to the corresponding monitor value saved in the monitor value saving area of the nonvolatile storage means, not the monitor value of the predetermined parameter itself, is stored in the monitor value storage area secured in the volatile storage means and when the monitor value must be saved, the variation in each of the monitor values stored in the monitor value storage area is added to the corresponding monitor value saved in the monitor value saving area and then the monitor value is replaced with the resulting monitor value, the capacity of the volatile storage means necessary for the monitor value storage area can be reduced as compared with that in the prior art and the correct monitor value can be saved in the monitor value saving area.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a magnetic disk drive according to an embodiment of the present invention;

DETAILED DESCRIPTION OF THE INVENTION

Figure 2:
FIG. 2 shows a monitor value saving area 110 secured in the system area of a disk 1.

Hereinafter, referring to the accompanying drawings, an embodiment of the present invention will be explained.

FIG. 1 is a block diagram of a magnetic disk drive according to an embodiment of the present invention.

In FIG. 1, numeral 1 indicates disks (magnetic disks) serving as mediums on which data is recorded and numeral 2 indicates heads (magnetic heads) used to write data onto the disks 1 (for data recording) and read the data from the disks 1 (for data reproduction). The heads 2 are provided so as to correspond to each data side of the disks 1.

On both sides of the disk 1, a large number of tracks are formed concentrically. On each track, a plurality of servo areas in each of which servo data used for positioning control or the like has been recorded are arranged at regular intervals, the servo data including cylinder data indicating a cylinder number and burst data for showing a position error in the cylinder specified by the cylinder data in the form of the amplitude of waveform. These servo areas are arranged radially on the disk 1, starting from the center outward across the individual tracks. The space between servo areas is a user area. One servo area and one user area following the servo area form a single servo sector. In the user area on each servo sector, a plurality of data sectors are set.

To a specific area on each side of each disk 1, a system area is allocated. The system area is set in a different area from the data area and is used to save information on defects in the corresponding disk side (a defect list), password information, etc.

In a specific area (a specific sector) on each system area, a monitor value saving area 110 as shown in FIG. 2 is secured which is used to save the monitor values (parameter values) of predetermined various parameters (events) that can contribute to failures in the magnetic disk drive. The monitor values saved in the monitor value saving area 110 include start-up time (4 bytes), the number of CSSs (Contact Start Stop) indicating the number of starts/stops of motor (4 bytes), the number of substitute sectors (2 bytes), power-on time (3 bytes), start retry (8 bytes), the number of power cycles (4 bytes), read error rate (4 bytes), seek error rate (4 bytes), and the number of seeks (4 bytes). The reason why the monitor value saving area 110 is secured in each of all of the system areas allocated to each side of each disk 1 is that the area is caused to back up the monitor values. The monitor value saving area 110, however, needs not be secured on each side of all of the disks 1, but has only to be secured in each system area on two sides or more. When backup is not required, the monitor value saving area may be secured only in a single system area.

The disks 1 rotate at a high speed by a spindle motor (SPM) 3. The heads 2 are installed on head moving mechanisms called carriages 4 and move over the radius of the disks 1 by the movement of the carriages 4. The carriages 4 are driven by a voice coil motor (VCM) 5.

The spindle motor 3 and voice coil motor 5 are connected to a motor driver 6. The motor driver 6 drives not only the spindle motor 3 by causing a control current to flow through the motor 3 but also the voice coil motor 5 by forcing a control current to flow through the motor 5. The value of the control current (controlled variable) is determined in a computing process at a CPU (microprocessor) and is given in the form of digital value.

Each head 2 is connected to a head IC 7 mounted on a flexible printed circuit board (FPC). The head IC 7 includes a head amplifier 71 for amplifying the analog output read by the heads 2 and controls the switching of the heads 2 and the input and output of the read/write signals from and to the heads 2.

The head IC 7 is connected to a read/write IC (read/write circuit) 8. The read/write IC 8 basically has the encoding/decoding function of processing the user data and the signal processing function of processing the servo data.

The read/write IC 8 receives the analog output (the read signal from the head 2) read from the disk 1 by the head 2 and amplified at the head amplifier 71 in the head IC 7 and causes the decoding function to perform the signal processing necessary for data reproduction, for example, the signal process of converting the analog output into NRZ data and transferring the converted data to a disk controller (HDC) 14. The read/write IC 8 also causes the encoding function to perform the signal processing necessary for data recording, for example, the signal process of modulating and converting the NRZ data (write data) sent from the HDC 14 into the data to be written onto the disk 1 (e.g., 2-7 or 1-7 modulation data) and transmitting the converted data to the head IC 7.

In addition to the recording and reproducing process of the user data, the read/write IC 8 further causes the signal processing function to reproduce the servo data necessary for the servo processing, including head positioning control. Specifically, the read/write IC 8 processes the servo data in the servo area read by the head 2 and outputs the data pulses including the cylinder data to a servo processing circuit 9. Furthermore, the read/write IC 8 sample-holds the peak of the burst data (in the servo data) and outputs it to the servo processing circuit 9.

The servo processing circuit 9 receives the data pulses and burst data from the read/write IC 8 and effects the signal processing necessary for servo processing. Specifically, the servo processing circuit 9 has the decoding function of extracting the cylinder data (cylinder number) from the data pulses from the read/write IC 8 and decoding the extracted signal and the function of generating timing signals for write gates, etc. The servo processing circuit 9 also has the A/D converting function of A/D (analog/digital) converting the burst data (analog signal) from the read/write IC 8 and outputting the converted signal to a CPU 10. The servo processing circuit 9 is composed of a gate array (GA), for example.

The CPU 10 is a one-chip microprocessor, for example. The CPU 10 controls each section of the magnetic disk drive according to the control program (firmware) stored in a ROM 11.

Control by the CPU 10 includes positioning control for moving the head 2 to the desired position (by driving the voice coil motor 5 via the motor driver 6) according to (the cylinder data and burst data in) the servo data extracted by the servo processing circuit 9 and read/write data transfer control by controlling the HDC 14.

Furthermore, the CPU 10 monitors the predetermined various parameters (events) in the magnetic disk drive and performs PFA that predicts a failure in the drive from the monitor values. To enable PFA, the CPU 10 performs not only the process of updating the variation in the monitor value of the event from a certain point in time (here, from the point in time that the previous saving was done on the monitor value saving area 110) on (the monitor value storage area 121 in) a RAM 12 explained later each time an event to be monitored occurs, but also the process of causing the updated variation in the monitor value to be reflected in the monitor value saving area 110 as the need arises (here, the process of adding the variation in the monitor value on the RAM 12 to the relevant monitor value saved in the monitor value saving area 110).

Connected to the CPU 10 are a ROM 11 serving as a nonvolatile memory in which a control program (firmware) for controlling each section of the magnetic disk drive and a work area for the CPU 10, and a RAM 12 serving as a rewritable memory that provides a storage area for control parameters used by the CPU 10. In a specific area on the RAM 12, a monitor value storage area 121 is secured in which the variation in the monitor value of each of the predetermined various events is temporarily stored.

Further connected to the CPU 10 are an EEPROM 13 serving as a rewritable nonvolatile memory in which parameters for controlling the magnetic disk drive are saved and a disk controller (HDC) 14.

The disk controller 14 (HDC) 14 controls not only the communication of commands and data with a host unit (not shown) but also the communication of data with (the disk 1 via) the read/write IC 8. To the HDC 14, a buffer memory (buffer RAM) 15 composed of, for example, a RAM, in which the read/write data is stored by a cache method and a host interface 16 are connected. The host interface 16 provides the interface between the HDC 14 and the host unit. The HDC 14 communicates commands and data with the host unit via the host interface 16.

To the CPU 10, a timer 17 is further connected. The timer 17 is driven each time, for example, the execution of a command has been completed and is used to measure a certain period of time. If a new command has not been received by the time measuring unit (time out), the drive will be set in the auto standby mode, in which the drive is brought into the standby state for power saving. In setting the standby mode, the auto saving function for automatically causing the contents of the monitor value storage area 121 to be reflected in the monitor value saving area 110.

Figure 3:
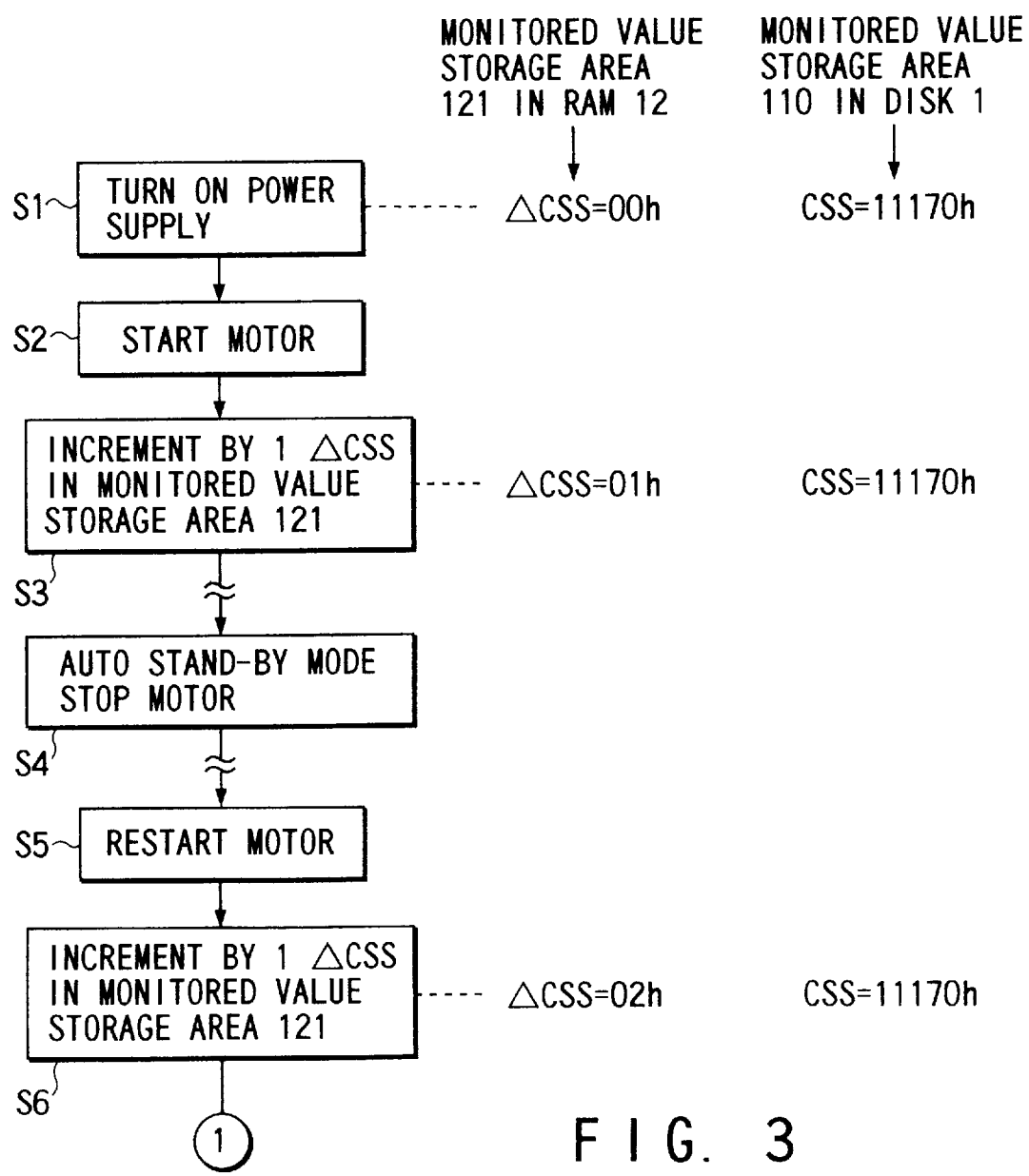
FIGS. 3 and 4 are part of the flowcharts to help explain the operation in the embodiment, giving an example of the case of using the number of CSSs as a parameter for PFA.
Figure 4:
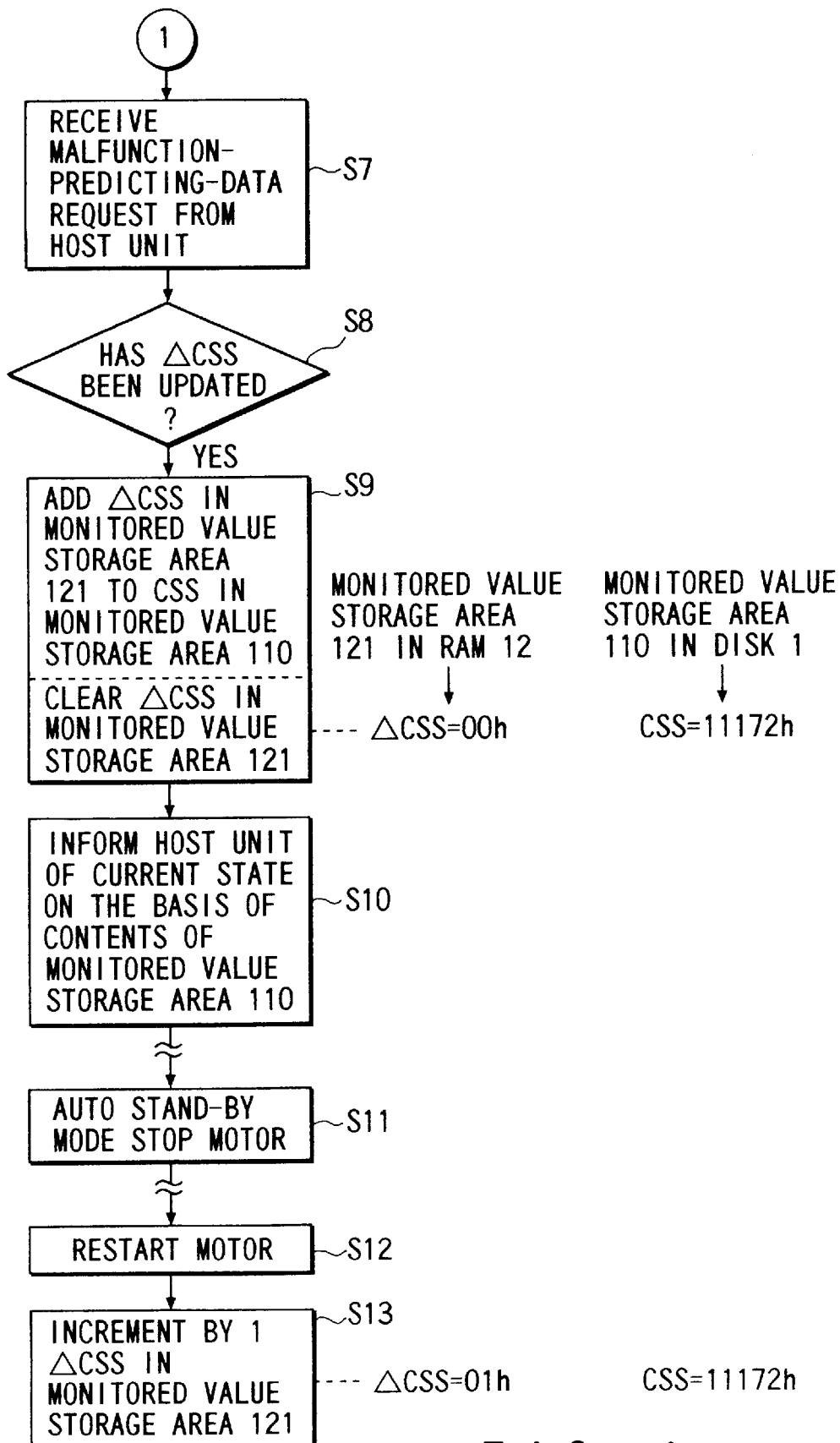

Next, giving an example of using the number of CSSs as a parameter for PFA, the operation of the configuration of FIG. 1 will be described by reference to the flowcharts in FIGS. 3 and 4.

It is assumed that the power supply of the drive is off at present and in this state, the monitor value CSS of the number of CSSs saved in the monitor value saving area 110 on the system area of the disk 1 is a hexadecimal number of 11170h (h at the end means a hexadecimal representation) representing 70000 times. Namely, it is assumed that the monitor value CSS indicating that CSS has been already performed 70000 times has been saved in the monitor value saving area 110. (For example, since the specification of the disk drive generally guarantees the number of CSSs to be more than 40000, the number of CSSs must count up to twice the guaranteed number, or 80000. The number of CSSs that can be represented in, for example, two bytes is about 65000 and the number of CSSs that can be represented in three bytes is about 16,000,000. Therefore, to count the number of CSSs larger than 80,000, the capacity greater than three bytes or more is necessary.)

When in this state, the power supply of the drive is turned on (step S1), the start-up process of the drive is performed under the control of the CPU 10. In the start-up process, the drive is initialized and the monitor value storage area 121 on the RAM 12 is cleared, thereby clearing all of the variations in the various monitor values (one byte of start-up time, one byte of the number of substitute sectors, one byte of power-on time, three bytes of start retry, one byte of the number of power cycles, one byte of seek error rate, one byte of read error rate, and one byte of the number of seeks) to "0," including the variation ΔCSS (here, one byte) in the number of CSSs stored in the monitor value storage area 121. Furthermore, the control parameters and the like saved in the EEPROM 13 are loaded into a specific area of the RAM 12 (for high-speed reference by the CPU 10).

The start-up process at the CPU 10 also includes a motor start process that starts the spindle motor 3. The spindle motor 3 is started by supplying a starting current from the CPU 10 via the motor driver 6 to the motor 3 (step S2).

Once the spindle motor 3 has been started after the turning on of the power supply, the CPU 10 increments by 1 the variation ΔCSS in the number of CSSs, the one relating to the start/stop (CSS operation) of the spindle motor 3 of the monitor values stored in the monitor value storage area 121 on the RAM 12 (step S3). This updates ΔCSS from 00h to 01h. On the other hand, the monitor value CSS of the number of CSSs on the monitor value saving area 110 remains at 11170h. Here, ΔCSS on the monitor value storage area 121 represents how many times the spindle motor 3 has been started, counting from the time when the previous CSS was saved in the monitor saving area 110, that is, ΔCSS indicates the variation in the number of CSSs, counting from the time when the previous CSS was saved.

After the start-up processing of the magnetic disk drive by the CPU 10 has been completed, it is possible to accept a command from the host unit and, for example, disk accessing is done according to the read/write command from the host unit.

The CPU 10 starts the timer 17 each time the command from the host unit has been executed and monitors whether or not a new command is issued from the host unit within a specific period of time measured by the time 17. If a new command has been accepted within the specific measured period of time, the CPU 10 will reset the timer 17 and execute the command.

In contrast, when a new command has not been received even after the time 17 has finished measuring the time, or the time has been out, the CPU 10 will set the auto standby mode, in which the drive is automatically brought into a standby state (step S4). In the standby mode, the spindle motor is stopped.

In the standby mode, when the host unit issues a command, the CPU 10 will supply a starting current via the motor driver 6 to the spindle motor 3 in order to start the spindle motor 3 again (step 5).

Once the spindle motor 3 has been started again, the CPU 10 increments by one the variation ΔCSS in the number of CSSs of the monitor value stored in the monitor value storage area 121 on the RAM 12 (step S6). This updates ΔCSS from 01h to 02h. On the other hand, the monitor value CSS of the number of CSSs on the monitor value saving area 110 remains at 11170h.

In this state, it is assumed that a command (PFA information report command) requesting for the report of PFA information has been issued from the host unit to the magnetic disk drive of FIG. 1. The PFA information report command issued from the host unit is received by the HDC 14 via the host interface 16 and then transferred to the CPU 10. Then, the CPU 10 accepts the request (for PFA information report) indicated by the PFA information report command from the host unit (step S7).

Receiving the request indicated by the PFA information report command from the host unit, the CPU 10 checks to see if the variation ΔCSS in the number of CSSs on the monitor value storage area 121 of the RAM 12 is a value other than 00h, that is, if ΔCSS has been updated (the spindle motor 3 has been started once or more times) after the previous CSS was saved in the monitor value saving area 110 (up to the present time).

If ΔCSS has been updated, the CPU 10 will add the present ΔCSS (here, 02h) to the monitor value CSS (here, 11170h) of the present number of CSSs saved in the monitor value saving area 110 provided in each system area of the disk 1 (CSS←CSS+ΔCSS), and will perform a saving process in which the present CSS is replaced with the resulting CSS (step S9). This updates the monitor value CSS of the number of CSSs from 11170h to 11172h. If any parameter other than the number of CSSs has been changed after the previous CSS was saved in the monitor saving area 110 (up to the present time), the CPU 10 will add the variation to the relevant monitor value in the monitor value saving area 110 in the same manner as the number of CSSs. Then, the CPU 10 clears the monitor value storage area 121. This clears all of the variations in the various monitor values, including ΔCSS, to "0." The monitor value saving process as shown in step S9 may be carried out, regardless of whether the variation in the corresponding monitor value in the monitor value storage area 121 has been changed (after the previous saving was done).

Next, the CPU 10 determines whether or not the drive is close to a failure on the basis of the various monitor values (including the number of CSSs) saved in the monitor value saving area 110 in the system area of the disk 1 and causes the HDC 14 to transfer the determination result (the present condition of the drive) to the host unit via the host interface 16 (step 10).

Thereafter, for example, when the drive is brought into the auto standby mode (step S11) and then the spindle motor 3 is started again (step S12), the variation ΔCSS in the number of CSSs on the monitor value storage area 121 will be counted from the initial value of 00h and take the value of 01h (step S13).

Since one byte is allocated to ΔCSS in the monitor value storage area 121 of the RAM 12, a maximum of 255 variations in the number of CSSs can be stored. Therefore, by adjusting the chance to saving the monitor value in the monitor value saving area 110 in the system area of the disk 1 (updating the number of CSSs in the monitor value saving area 110), the area in the RAM 12 for dealing with the number of CSSs (which originally must count more than 80000), one parameter, can make do with one byte (as compared with four bytes in the prior art).

In this way, a failure in the drive unit is predicted on the basis of the monitor values saved in the monitor value saving area 110. The details of a method of predicting a failure in the drive have been disclosed in, for example, U.S. Pat. No. 5,410,439 (issued to Gary T. Egbert et al. on Feb. 22, 1994).

Until now, explanation has been given of the case where the monitor value saving process in which the latest monitor value has been saved is performed by adding the variations in the various monitor values, including ΔCSS, stored in the monitor value storage area 121 of the RAM 12 to the relevant monitor values saved in the monitor value saving area 110 on the system area of the disk 1, only when the PFA information report command from the host unit has been received. When a predetermined event has occurred, for example, when the mode has been switched to the auto standby mode, the drive may be constructed so that a similar monitor value saving process may be performed automatically.

Furthermore, while the explanation has been given, mainly on the case where the number of CSSs is used as a parameter for PFA, another parameter, for instance, the number of seeks, may be used. In an example of using the number of seeks as a parameter for PFA, the variation in the number of seeks stored in the monitor value storage area 121 of the RAM 12 is incremented by one each time a seek operation is performed. The variation in the number of seeks (counting from the time when the previous number of seeks was saved) stored in the monitor value storage area 121 is added to the monitor value of the present number of seeks saved in the monitor value saving area 110 provided in each system area of the disk 1 when the PFA information report command from the host unit has been received, or when a predetermined event for enabling the auto saving function, such as the auto standby mode, to operate has occurred, and then the saving process in which the present monitor value is replaced with the resulting monitor value is performed. In this case, the area in the RAM 12 for dealing with the number of seeks (which originally must count more than 16000000), one parameter, can make do with one byte (for a maximum of 255 seeks) or two bytes (a maximum of about 65000 seeks) (as compared with four bytes in the prior art).

The same is true for the other parameters. The number of bytes needed for each of start-up time, the number of CSSs, the number of power cycles, seek error rate, and read error rate is decreased from four to one. The number of bytes needed for the number of substitute sectors reduces from two to one; that for power-on time decreases from three to one; and that for start retry decreases from eight to three. As a result, only one byte is required to store the parameter of each of start-up time, the number of CSSs, the number of substitute sectors, power-on time, start retry, the number of power cycles, seek error rate, read error rate, and the number of seeks, in the monitor value storage area 121, reducing the number of bytes needed to 11 bytes in total. Consequently, these parameters can be stored sufficiently in the 27-byte PFA storage area.

While in the above embodiment, explanation has been given provided that the various monitor values are saved on (the monitor value saving area 110 secured on the system area of) the disk 1, they may be saved in, for example, the EEPROM 13, or a nonvolatile storage medium other than the disk 1, such as a flag memory (not shown).

Furthermore, while in the above embodiment, the case where the present invention has been applied to a magnetic disk drive has been explained, the invention may be applied to all types of disk drive, such as a magneto-optical disk drive or a CD-ROM drive. Additionally, the present invention is not limited to the disk drive, but may be applied to all types of information equipment that has the PFA function that monitors the predetermined events that can contribute to failures in the equipment and predicts a failure in the equipment from the monitor values.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive having a failure prediction function for monitoring predetermined various events relating to failures of the drive and for predicting a failure of the drive from monitored values, comprising:

nonvolatile storage means in which a monitor value saving area is secured for saving a monitor value of each event;

volatile storage means in which a temporary monitor value storage area is secured for temporarily storing a variation of a monitor value of each event;

update means for updating the monitor value variation stored in the temporary monitor value storage area corresponding to the event each time a predetermined event is detected; and monitor value saving control means for, when the monitor value is required to be saved in the monitor value saving area, adding the monitor value variation updated by the updating means among the monitor value variations stored in the temporary monitor value storage area to the corresponding monitor value saved in the nonvolatile storage means, and for substituting the addition result for the corresponding monitor value.

2. The disk drive according to claim 1, wherein the monitor value saving control means adds the monitor value variation stored in the temporary monitor value storage area to the corresponding monitor value saved in the monitor value saving area, and clears the temporary monitor value storage area after substituting the addition result for the corresponding monitor value.

3. A monitor value saving control method in a disk drive having a failure prediction function for monitoring predetermined various events related to a failure of the drive and for predicting a failure of the drive from monitored values, the method comprising the computer steps of:

saving a monitor value of each event in a monitor value saving area of a nonvolatile memory;

temporarily storing, in a temporary monitor value storage area of a volatile memory, a variation of the monitor value of each event;

updating a monitor value variation in the temporary monitor value storage area corresponding to the event each time a predetermined event is detected; and adding, when the saving of the monitor value is to be required in the monitor value saving area, updated monitor value variation among the monitor value variations stored in the temporary monitor value storage area to the corresponding monitor value stored in the monitor value saving area and for substituting the addition result for the corresponding monitor value.

4. The method according to claim 3, wherein the temporary monitor value storage area is cleared after the monitor value variation stored in the temporary monitor value storage area is added to the corresponding monitor value saved in the monitor value saving area and the addition result is substituted for the corresponding monitor value.

5. A disk drive comprising:

monitor means for monitoring predetermined various events relating to failures of the drive;

nonvolatile storage means in which a monitor value saving area is secured for saving a monitor value of each event from the monitor means;

volatile storage means in which a temporary monitor value storage area is secured for temporarily storing a variation of a monitor value of each event;

update means for updating the monitor value variation in the temporary monitor value storage area corresponding to the event each time a predetermined event is detected; and monitor value saving control means for, when the monitor value is required to be saved in the monitor value saving area, adding the monitor value variation updated by the updating means among the monitor value variations stored in the temporary monitor value storage area to the corresponding monitor value saved in the monitor value saving area, and for substituting the addition result for the corresponding monitor value.

6. A monitor value saving control method in a disk drive, comprising the steps of:

monitoring predetermined various events relating to failures of the drive;

saving a monitor value of each event from the monitoring step in a monitor value saving area of a nonvolatile memory;

temporarily storing a variation of a monitor value of each event, in a temporary monitor value storage area of a volatile memory;

updating the monitor value variation stored in the temporary monitor value storage area corresponding to the event each time a predetermined event is detected; and adding the monitor value variation updated by the updating step among the monitor value variations stored in the monitor value storage area to the corresponding monitor value saved in the monitor value saving area, and for substituting the addition result for the corresponding monitor value, when the monitor value is required to be saved in the monitor value saving area.

7. A disk drive having a failure prediction function for monitoring predetermined various events relating to failures of the drive and for predicting a failure of the drive from monitored values, comprising:

monitor means for monitoring predetermined various events relating to failures of the drive;

nonvolatile storage means in which a monitor-value saving area is secured for saving a monitor value of each event;

volatile storage means in which a temporary monitor value storage area is secured for temporarily storing a variation of a monitor value of each event;

update means for updating the monitor value variation stored in the temporary monitor value storage area corresponding to the event each time a predetermined event is detected;

monitor value saving control means for, when the monitor value is required to be saved in the monitor value saving area, adding the monitor value variation updated by the updating means among the monitor value variations stored in the monitor value storage area to the corresponding monitor value saved in the nonvolatile storage means, and for substituting the addition result for the corresponding monitor value; and predicting means for predicting a failure of the drive from the monitor values saved in the monitor value saving area including the substituted monitor value.

8. A monitor value saving control method in a disk drive having a failure prediction function for monitoring predetermined various events relating to failures of the drive and for predicting a failure of the drive from monitored values, comprising the steps of:

monitoring predetermined various events relating to failures of the drive;

saving a monitor value of each event in a monitor value saving area of a nonvolatile memory;

temporarily storing, in a temporary monitor value saving area of a volatile memory, a variation of a monitor value of each event;

updating the monitor value variation stored in the temporary monitor value storage area corresponding to the event each time a predetermined event is detected;

adding the monitor value variation updated by the updating step among the monitor value variations stored in the monitor value storage area to the corresponding monitor value saved in the nonvolatile memory, and for substituting the addition result for the corresponding monitor value, when the monitor value is required to be saved in the monitor value saving area; and predicting a failure of the drive from the monitor values saved in the monitor value saving area including the substituted monitor value.

9. A disk drive having a failure prediction function for monitoring predetermined various events relating to failures of the drive and for predicting a failure of the drive from monitored values, comprising:

nonvolatile storage means in which a monitor value saving area is secured for saving a monitor value of each event;

volatile storage means in which a temporary monitor value storage area is secured for temporarily storing a variation of a monitor value of each event;

update means for updating the monitor value variation stored in the temporary value storage area corresponding to the event each time a predetermined event is detected;

monitor value saving control means for, when the monitor value is required to be saved in the monitor value saving area, adding the monitor value variation updated by the updating means among the monitor value variations stored in the temporary monitor value storage area to the corresponding monitor value saved in the nonvolatile storage means, and for substituting the addition result for the corresponding monitor value; and means for predicting failures of the drive from the monitor values stored in the nonvolatile storage means.

10. A monitor value saving control method in a disk drive having a failure prediction function for monitoring predetermined various events related to a failure of the drive and for predicting a failure of the drive from monitored values, the method comprising the computer steps of:

saving a monitor value of each event in a monitor value saving area of a nonvolatile memory;

temporarily storing, in a temporary monitor value storage area of a volatile memory, a variation of the monitor value of each event;

updating a monitor value variation stored in the temporary monitor value storage area corresponding to the event each time a predetermined event is detected;

adding, when the saving of the monitor value is required to be saved in the monitor value saving area, updated monitor value variation among the monitor value variations stored in the temporary monitor value storage area to the corresponding monitor value stored in the monitor value saving area and for substituting the addition result for the corresponding monitor value; and predicting failures of the drive from the monitored values stored in the monitor value saving area.

* * * * *